United States Patent
Nacamuli

(10) Patent No.: US 6,591,445 B2
(45) Date of Patent: Jul. 15, 2003

(54) ARRANGEMENT OF SHAFT COUPLING ELEMENT FOR WINDSCREEN WIPER

(75) Inventor: Marc Nacamuli, Sao Paulo (BR)

(73) Assignee: Eletromecanica Dyna S/A, Guarulhos (BR)

( * ) Notice: Subject to any disclaimer, the term of this patent is extended or adjusted under 35 U.S.C. 154(b) by 38 days.

(21) Appl. No.: 09/801,934

(22) Filed: Mar. 9, 2001

(65) Prior Publication Data

US 2002/0026681 A1 Mar. 7, 2002

(30) Foreign Application Priority Data

Sep. 4, 2000 (BR) .......................................... 8001932 U

(51) Int. Cl.$^7$ ................................................ B60S 1/40
(52) U.S. Cl. .................................................. 15/250.32
(58) Field of Search ......................... 15/250.32, 250.43, 15/250.44, 250.361, 250.451, 250.452

(56) References Cited

U.S. PATENT DOCUMENTS 5,084,933 A * 2/1992 Buechele .................. 15/250.32
5,435,041 A * 7/1995 Ho ........................... 15/250.201
5,632,059 A * 5/1997 Lee .......................... 15/250.32
6,000,093 A * 12/1999 Charng .................... 15/250.201
6,178,588 B1  1/2001 Kotlarski

FOREIGN PATENT DOCUMENTS

BR  MU8000354-0  2/2000
GB  2163042  2/1986

* cited by examiner

Primary Examiner—Gary K. Graham
(74) Attorney, Agent, or Firm—Larson & Taylor PLC

(57) ABSTRACT

A shaft coupling element for windscreen wipers that solves the problem entailed by the multiplicity of fastening device coupling elements and shafts by providing a universal device that allows the installation by the user, in a simple, easy and quick way. The universal device includes a central body, three transversal coupling bores of different dimensions set on the central area of the main body, two lateral bulges located at both lateral walls of the main body, two flexible adjustment pawls located transversally on the upper part of the main body, a slack reducing moving part located at the end of the main body (1) over which rests the windscreen wiper's shaft hook, two protuberances adjacent to the central hole and two moving locking bulges located at the end of the main body between which rests the windscreen wiper's shaft hook.

6 Claims, 2 Drawing Sheets

ARRANGEMENT OF SHAFT COUPLING ELEMENT FOR WINDSCREEN WIPER

FIELD OF THE INVENTION

The present invention relates to an "ARRANGEMENT OF SHAFT COUPLING ELEMENT FOR WINDSCREEN WIPER", applied to windscreen wipers in general. The present invention reveals a shaft coupling element for windscreen wiper that solves the problem entailed by the multiplicity of fastening device coupling elements and shafts.

The main objective of the present invention is to provide a universal device that allows the installation by the user, in a simple, easy and quick way.

1. Background of the Invention

The coupling elements of the current state of the art systems present a multiplicity of forms, each one specifically designed to allow the fastening of a certain type of coupling element to a certain type of shaft.

The current state of the art presents some endeavors towards the universalization of the shaft coupling element for windscreen wiper, as for example the Brazilian Patent Application MU 8000354-0 of the same Applicant, which nevertheless presents some of the inconveniences described herein below.

2. Current State of the Art Inconveniences

The current state of the art presents some inconveniences.

The lack of a market standard in the auto-parts market forces the manufacturers of shaft coupling elements for windscreen wipers to produce a wide variety of specific models for their coupling elements. That generates several inconveniences such as logistical problems, the need for larger stocks and higher manufacturing costs.

The configuration of the current art shaft coupling elements for windscreen wipers makes for a difficult mounting of the wiper on the shaft, requiring the use of force to lock-up the connection between the system components. An imprecise use of force upon an element that is sensitive to deformation creates a risk of damage/distortion that could eventually hamper the system's performance.

Another negative aspect, specially in those cases in which the locking between the wiper and the shaft is based on a system known by those skilled in the art by the name of side-lock, is that the assembly of the device by the user requires a certain level of skill, both to assemble and disassemble it.

The rotation of the wiper's arc is paramount for the system's performance, because this movement compensates the variation of the relative positioning between the wiper's shaft and the external face of the windshield. In some of the current art devices, such as the one revealed on the Brazilian Patent Application MU 8000354-0 of the same Applicant, at least one of the elements employed to stabilize the coupling between the wiper and the coupling element interferes with the rotation movement of the wiper's arc, harming the system's performance.

SUMMARY OF THE INVENTION

The present invention solves the inconveniences associated with the current state of the art through the use of an optimized universal device that allows the assembly by the user. It can be used on systems having a shaft with hook-shaped ends of 9×4, 9×3 or 8×3 and also on side-lock coupling systems of ¼" or ³⁄₁₆". The invention presents a single coupling element that is compatible with 5 different types of coupling between wiper and shaft, by means of a system that comprises 2 lateral pawls and 3 transversal bores.

BRIEF DESCRIPTION OF THE DRAWINGS

The present invention will be better described with the aid of the annexed Figures, of which.

DESCRIPTION OF THE PREFERRED EMBODIMENT

Figure 1:
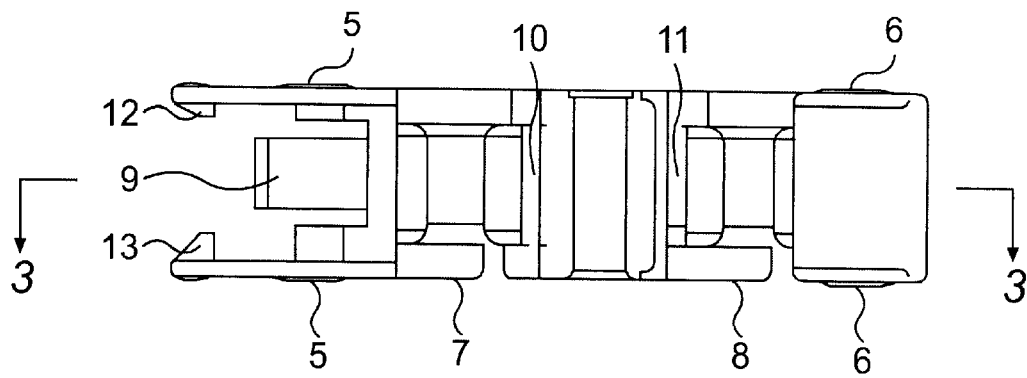
FIG. 1 is a lower plan view of the present invention.
Figure 2:
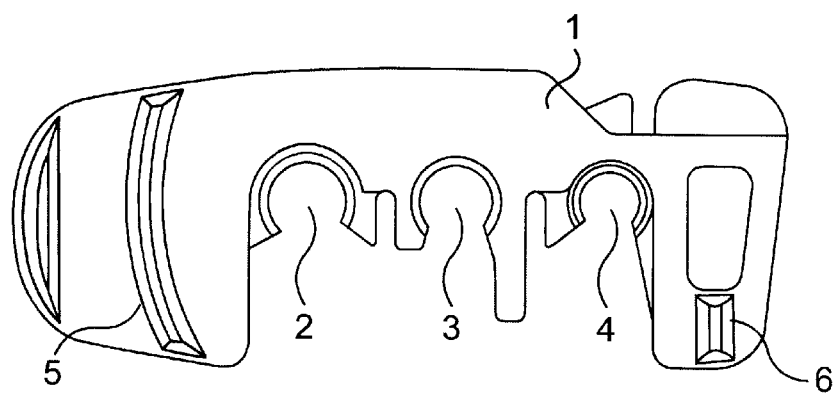
FIG. 2 is a front view of the present invention.
Figure 3:
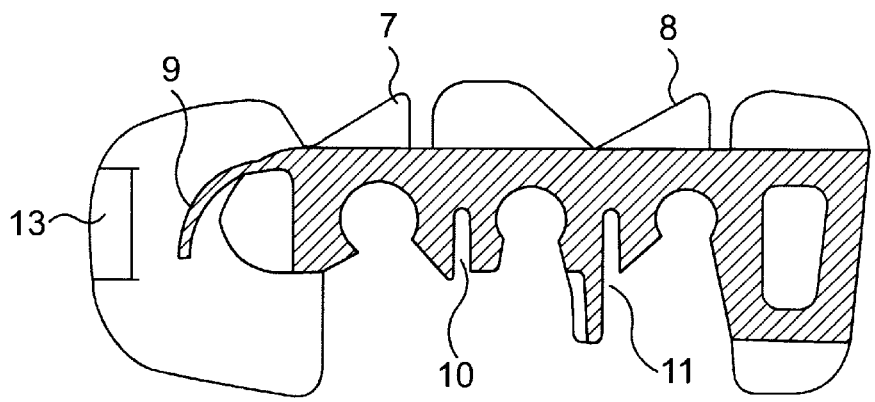
FIG. 3 is a lateral cross section view of the present invention.

According to the figures indicated above, the coupling element of the present invention comprises a main body (1) featuring 3 transversal bores (2, 3 and 4), used respectively for the coupling of the ¼" side-lock pin, the wiper's central pin and the ³⁄₁₆" side-lock pin.

To couple the shaft (101) with a 8×3 hook on its end, the invention presents two lateral pawls (7 and 8) designed to provide a perfect adjustment of the shaft's hook with its corresponding coupling element.

With the purpose of ensuring an easy side-lock coupling, the bores 2 and 4 of the present invention's coupling element alternatively present guiding chamfers to guide such coupling.

For the coupling between the coupling element and the shaft ends equipped with 9×4 or 9×3 hooks, the two lateral pawls (7 and 8) are flexed, opening space to accommodate the shaft (101) end hook between the side walls of the coupling element. Further, the invention presents a moving claw (9). The claw (9) function is to eliminate any possible slack between the coupling element and the shaft (101) end hook.

The present invention also features two jags (10 and 11) adjacent to the central bore (3), designed to add higher flexibility to the system, ensuring the easiness of assembly of the coupling element to the wiper's central pin and also the assembly of the pins on the side-lock coupling.

There are also two bulges (12 and 13) which purpose is to avoid the undesired disassembly of the system during it's operation.

Figure 4:
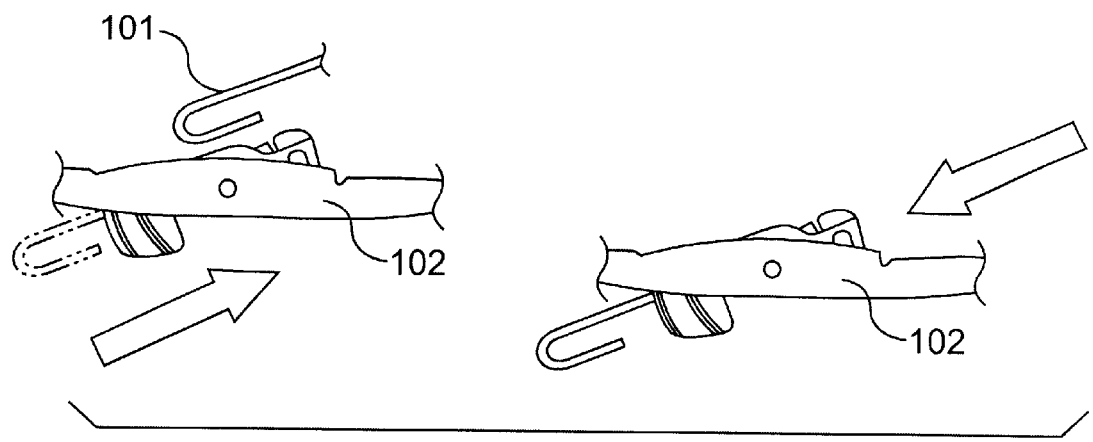
FIG. 4 is a front view of the present invention depicting the assembly of a shaft with a hook-shaped end.

FIG. 4 shows the assembly of the shaft end hook (9×4, 9×3 or 8×3) to the coupling element, made by means of a small rotation of the coupling element, positioning the wiper in such a way that the shaft (101) end hook is set inside the main arc of the of the wiper (102) and pushing the wiper against the shaft (101) end hook in the direction of the locking of the shaft (101) against the coupling element. In order to undo the coupling of the shaft (101) end hook, the wiper is rotated in relation to the shaft, a gentle pressure is applied to open the bulges (12) and (13) and the wiper is moved in the opposite direction of the one indicated for the assembly process.

Figure 5:
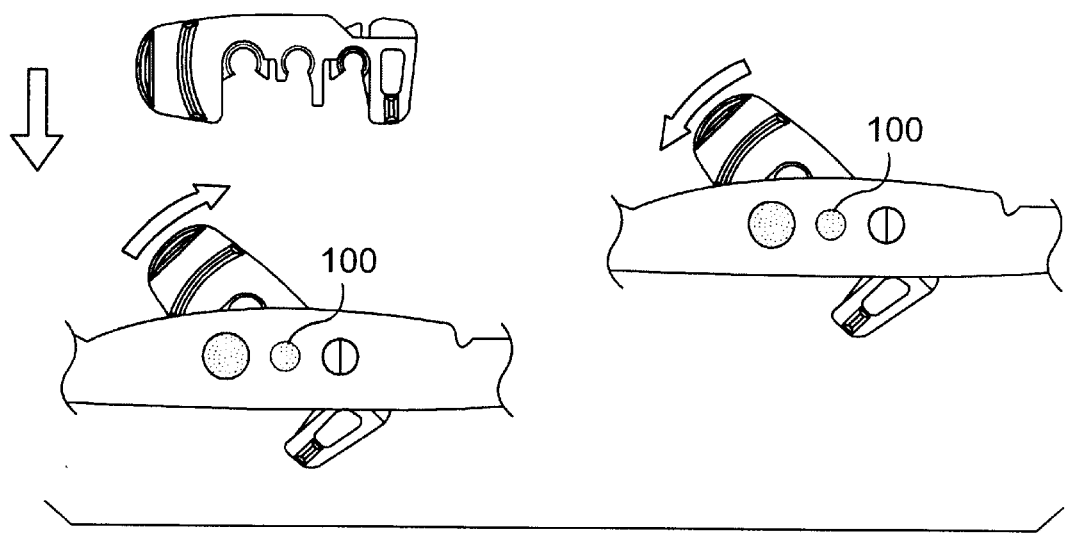
FIG. 5 is a front view of the present invention depicting the assembly of the ¼" side-lock coupling.

The fixing of the present invention when the side-lock system is used (FIG. 5) requires the locking of the coupling element onto the wiper before it is fixed on the tip of the windscreen wiper shaft. That is done fixing said coupling element to the wiper's central pin (100) through its central bore (3); rotating the coupling element in the direction that liberates the lateral access to the side-lock hole to be used. The side-lock pin is then positioned on its corresponding hole (¼" or ³⁄₁₆") of the wiper, rotating and pushing the coupling element against the lateral pin set, until it locks on the corresponding hole (2 or 4).

The disassembly of the side-lock system is done pulling the coupling element on the opposite direction of the one used on the assembly process, until it unlocks, and then the side-lock pin is pulled out.

The present invention offers multiple advantages compared to the current state of the art. The most immediate is the effective standardization obtained by the shaft coupling elements for windscreen wipers, simplifying logistics, reducing the required stocks and the manufacturing costs.

Another advantage of the present invention is that the shape of the shaft coupling elements for windscreen wipers ensures an easy assembly of the wiper on the shaft, no longer requiring the use of force to couple the system's components and thus eliminating the risk of distortions that could harm the system's performance.

Another advantage of the present invention is that the presence of lateral chamfers on the holes (2) and (4) makes the assembly of the side-lock system easy, so that the user himself can both assemble and disassemble it with no trouble at all.

Another advantage of the present invention when compared to the current state of the art, for example revealed on the Brazilian Patent Application MU 8000354-0 of the same Applicant, is the elimination of any coupling parts that interfere with the rotation movement of the wiper's arc, favoring the system's performance.

Finally, the presence of the protuberances (10) and (11) adjacent to the central hole (3) makes the assembly of the coupling element on the wiper's central pin easy.

What is claimed is:

1. A universal shaft coupling element for a windscreen wiper which attaches the wiper to a fastening device of a vehicle, said shaft coupling element comprising:
   a main body having
      a longitudinal top surface,
      first and second lateral sides extending away from said top surface, each lateral side having a central lower cutout, and said first lateral side also having an upper extent extending above said top surface,
      a central portion extending away from said top surface and located between said central cutouts of said lateral sides, and
      a first transversal bore in said central portion opening transversally away from said top surface so that a central pin of the wiper is receivable therein;
   a first coupling arrangement on said main body for coupling said main body to a lock pin of a fastening device, said first coupling arrangement, including
      second and third transversal bores in said central portion of said main body, said second and third bores (a) being located on opposite longitudinal sides of said first bore, (b) opening transversally away from said top surface, and (c) having respective different sizes in order to transversally accommodate respective different sized lock pins therein, and
      a jag on each longitudinal side of said first bore such that opening of the first, second and third transverse bores is facilitated;
   a second coupling arrangement on said main body for coupling said main body to a hook end of a fastening device, said second coupling arrangement including
      first and second flexible adjustment pawls located longitudinally in series along an upper part of the top surface which together with said upper extent of said first lateral side receive therebetween and engage respective sides of different sized hook ends as the hook end receives said central portion therein, and
      a moving part located at end of said main body between said first and second lateral sides which movingly engages an inside hooking portion of the hook end as the central portion is received in the hook end.

2. A universal shaft coupling element as claimed in claim 1, wherein said first coupling arrangement further includes a lateral bulge on an outside surface of each said lateral side at both longitudinal ends thereof.

3. A universal shaft coupling element as claimed in claim 1, wherein said second coupling arrangement further includes longitudinally extending segments of said first and second lateral sides between which the hooking portion of the hook end is received and respective locking bulges provided on inside surfaces of said segments which are moved away from one another to admit the hook end and which help prevent the hook end from moving once said central portion is received therein.

4. A universal shaft coupling element as claimed in claim 1, wherein said second and third bores have lateral chamfers to ease receipt of the lock pin therein.

5. A universal shaft coupling element as claimed in claim 2, wherein said second coupling arrangement further includes longitudinally extending segments of said first and second lateral sides between which the hooking portion of the hook end is received and respective locking bulges provided on inside surfaces of said segments which are moved away from one another to admit the hook end and which help prevent the hook end from moving once said central portion is received therein.

6. A universal shaft coupling element as claimed in claim 5, wherein said second and third bores have lateral chamfers to ease receipt of the lock pin therein.

* * * * *